Figure 1:
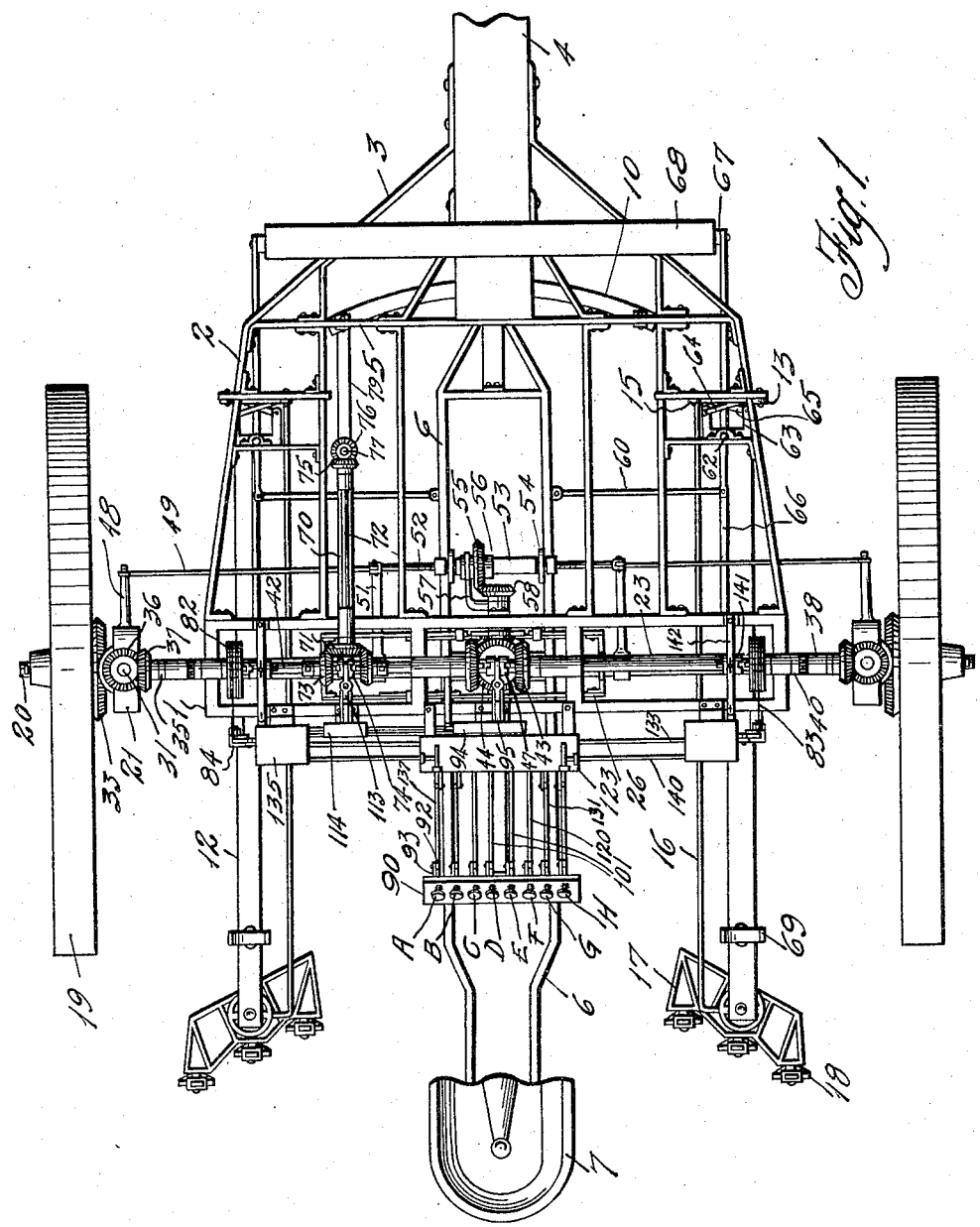

J. E. BLALOCK.
CULTIVATOR.
APPLICATION FILED SEPT. 4, 1915.

1,182,340.

Patented May 9, 1916.
6 SHEETS—SHEET 1.

INVENTOR
J. E. BLALOCK
BY
ATTORNEY

J. E. BLALOCK.
CULTIVATOR.
APPLICATION FILED SEPT. 4, 1915.
1,182,340.
Patented May 9, 1916.
6 SHEETS—SHEET 2.
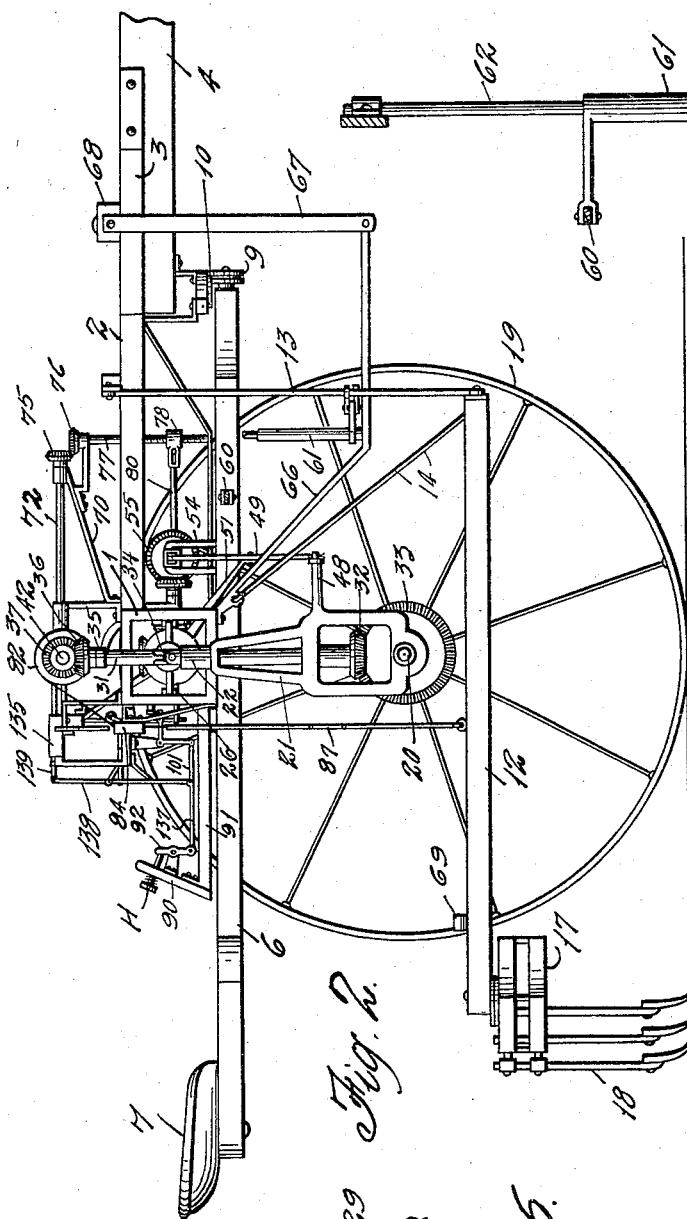
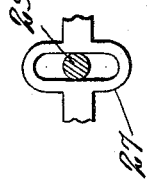
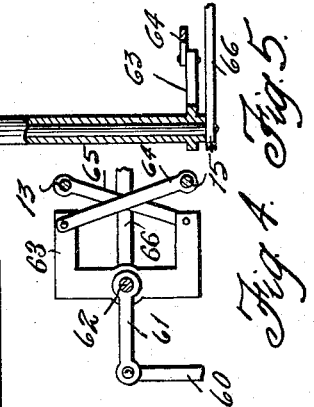
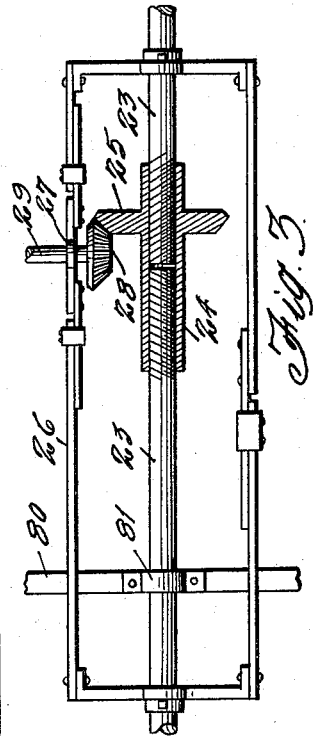
INVENTOR
J. E. BLALOCK
BY
ATTORNEY J. E. BLALOCK.
CULTIVATOR.
APPLICATION FILED SEPT. 4, 1915.
1,182,340.
Patented May 9, 1916.
6 SHEETS—SHEET 3.
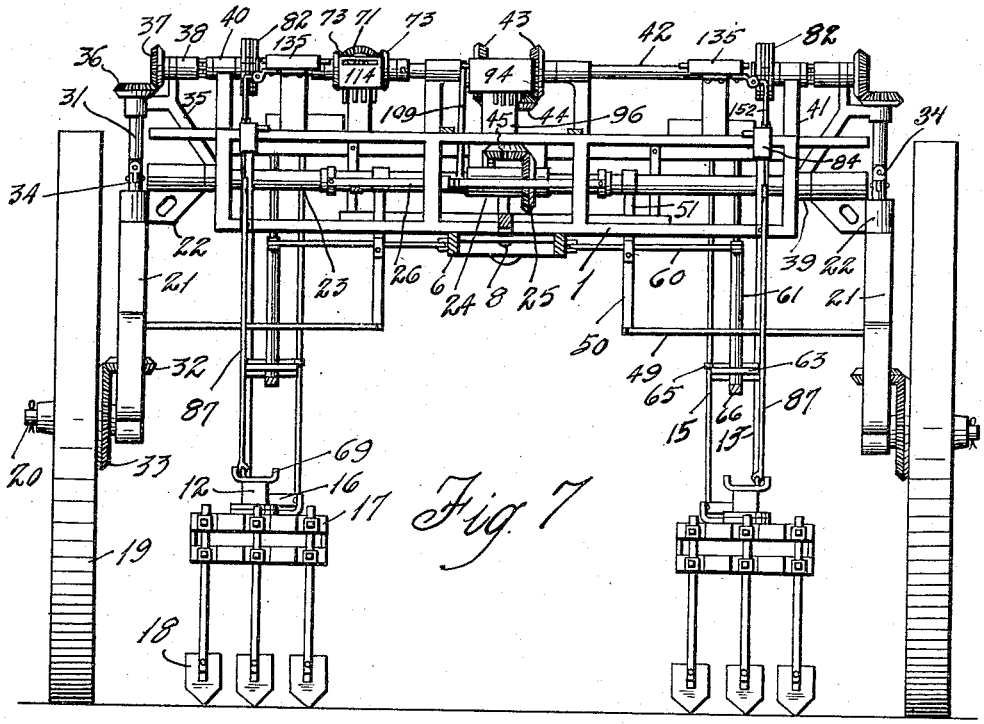
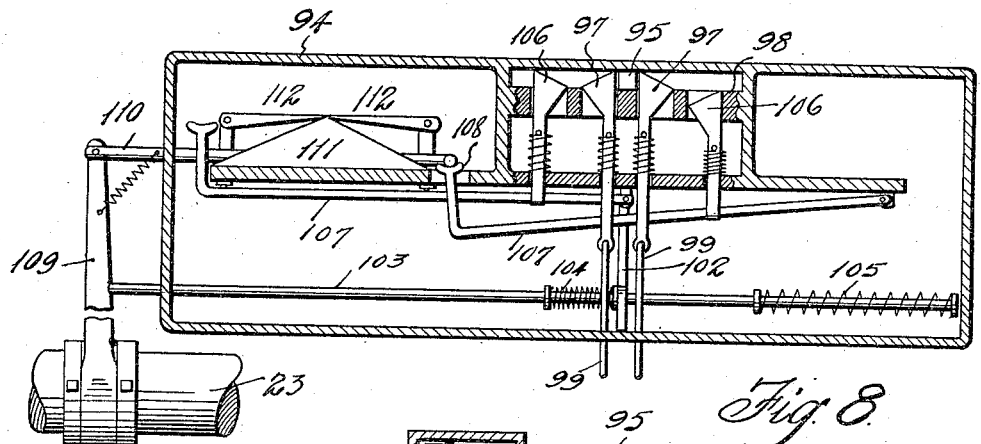
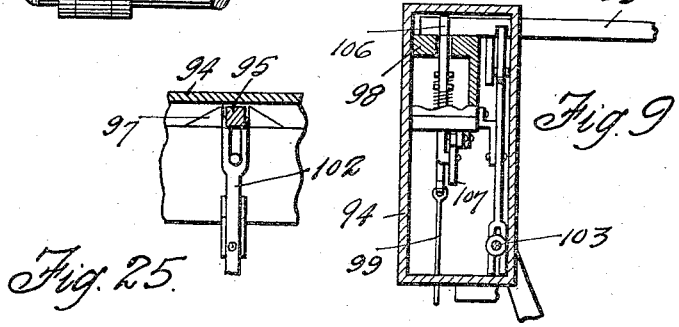
INVENTOR
J. E. BLALOCK
BY
ATTORNEY

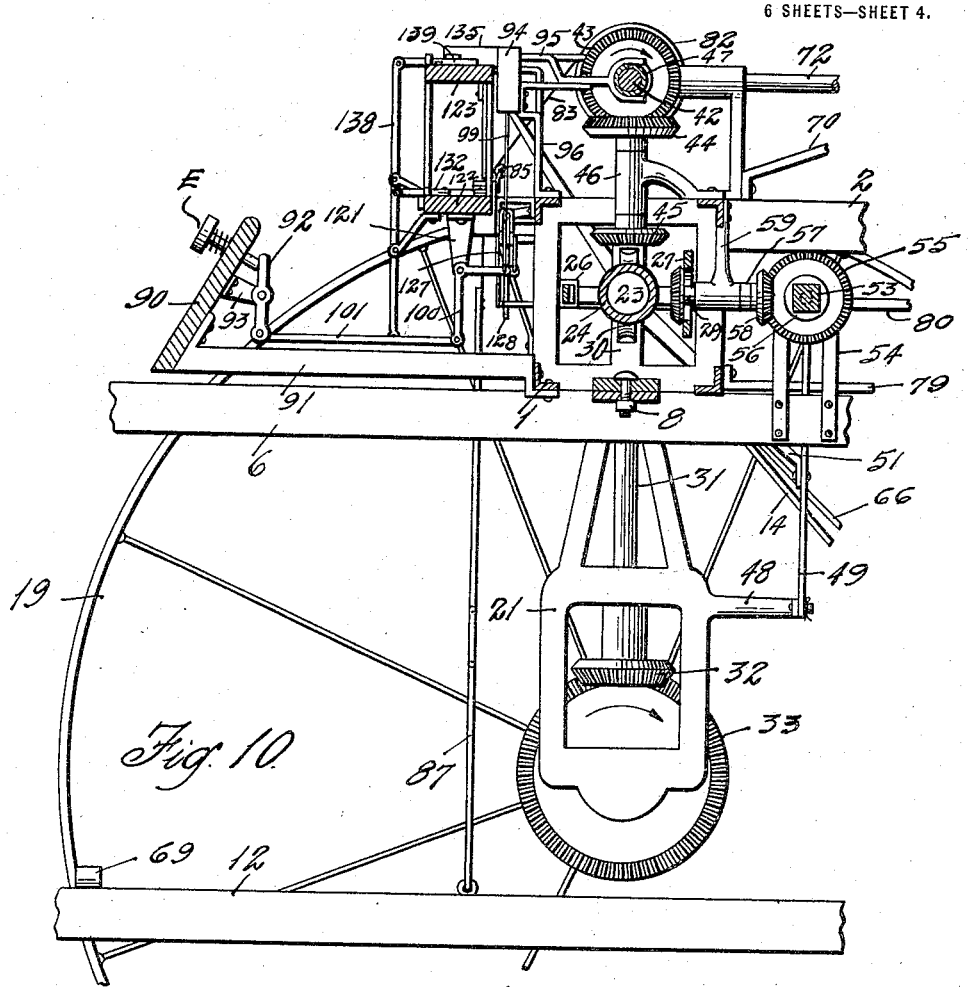
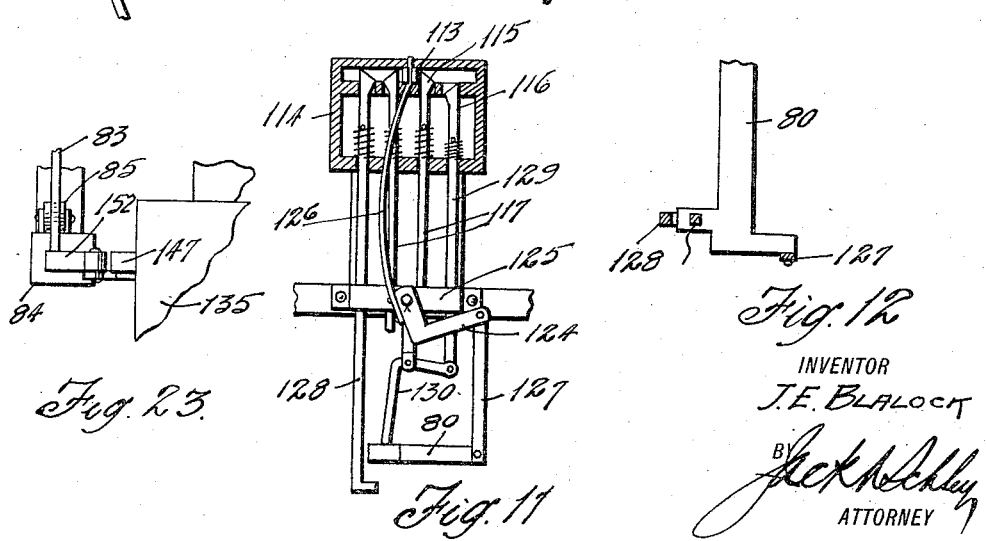

J. E. BLALOCK.
CULTIVATOR.
APPLICATION FILED SEPT. 4, 1915.
1,182,340.
Patented May 9, 1916.
6 SHEETS—SHEET 5.
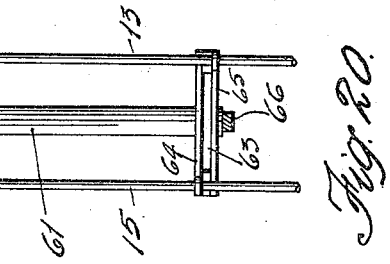
Fig. 20.
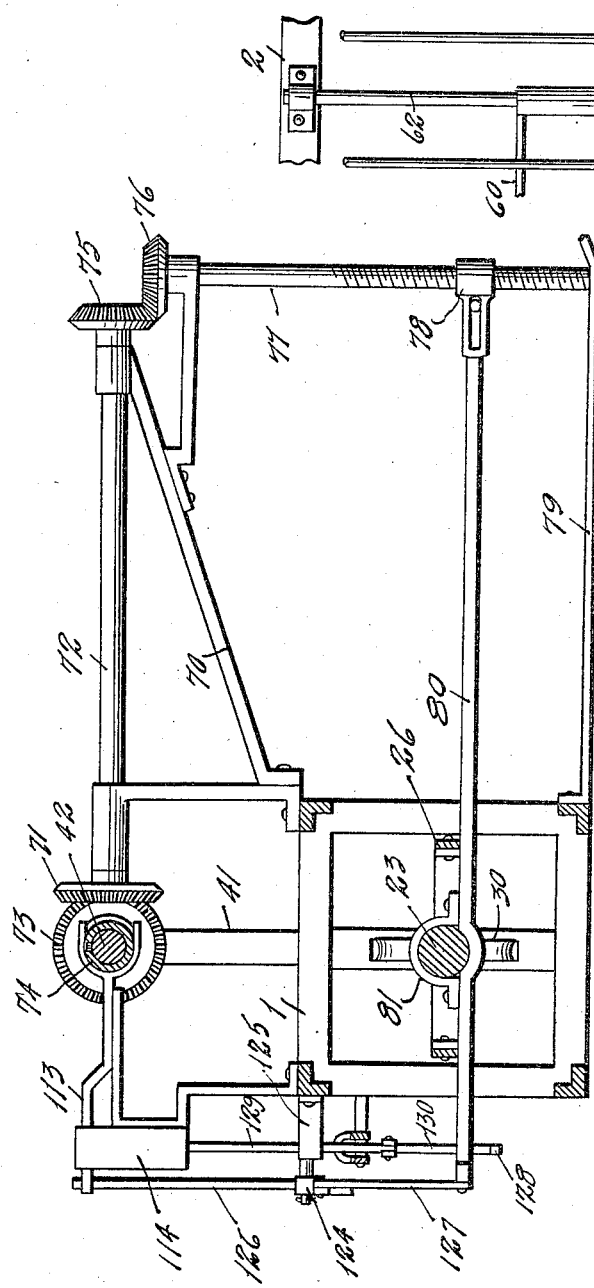
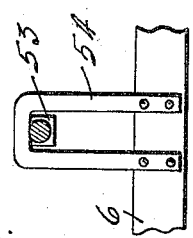
Fig. 13.
Fig. 22.
Fig. 21.
INVENTOR
J. E. BLALOCK
BY Jack N Schley
ATTORNEY

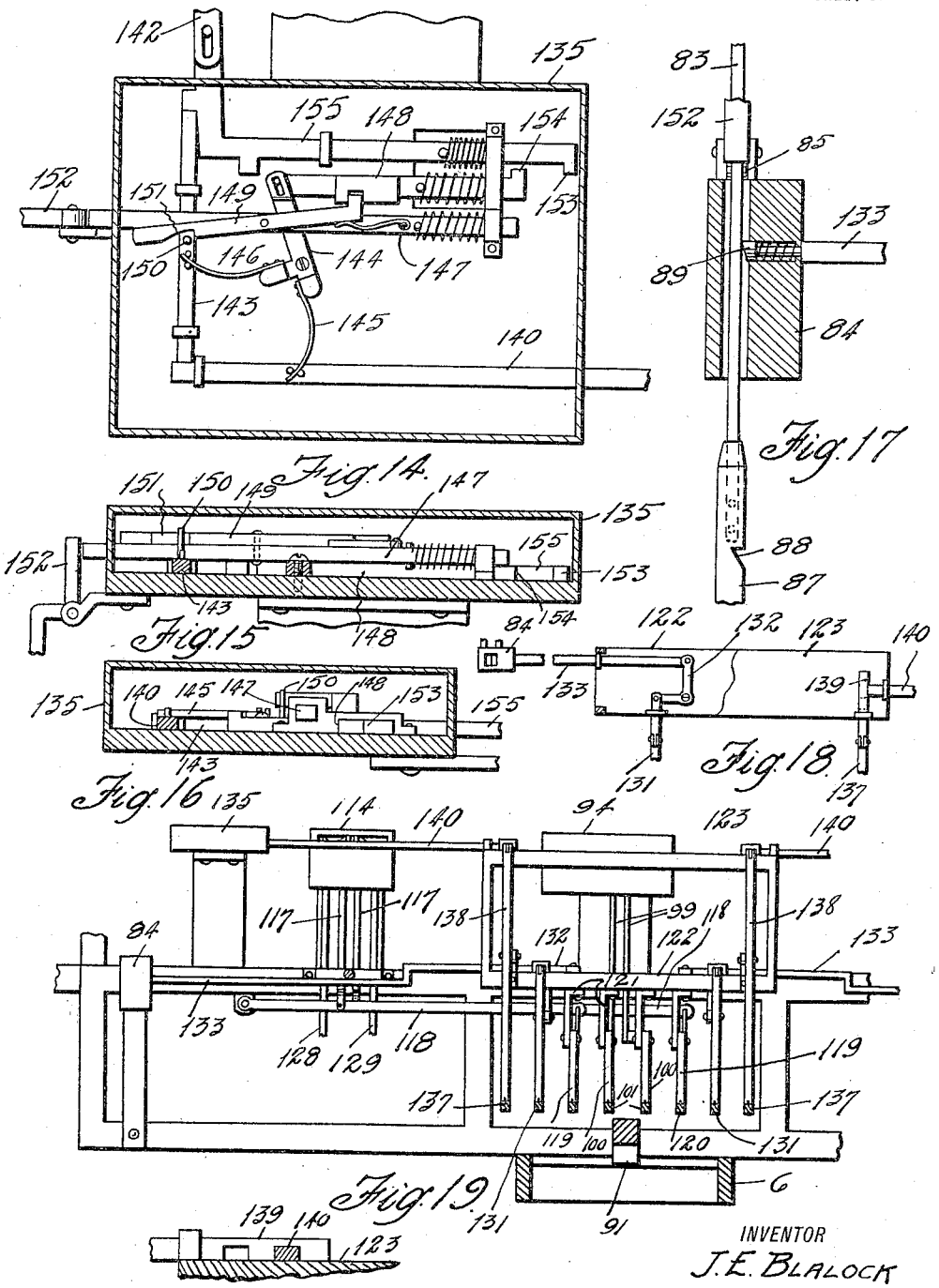

UNITED STATES PATENT OFFICE.

JUSTICE E. BLALOCK, OF DALLAS, TEXAS.

CULTIVATOR.

1,182,340.

Specification of Letters Patent.

Patented May 9, 1916.

Application filed September 4, 1915. Serial No. 49,091.

*To all whom it may concern:*

Be it known that I, JUSTICE E. BLALOCK, a citizen of the United States, residing at Dallas, in the county of Dallas and State of Texas, have invented certain new and useful Improvements in Cultivators, of which the following is a specification.

This invention pertains to new and useful improvements in cultivators.

The object of the invention is to provide a cultivator involving novel mechanisms for carrying out various adjustments in an expeditious manner, some of said adjustments being, provision for swinging the wheels and the forward ends of the gangs simultaneously whereby the gangs immediately track the wheels; provision for adjusting the cultivator to the weight of the driver in the seat whereby the machine is balanced; provision for spreading the wheels apart or drawing them toward each other; and provision of means for raising and lowering the rear ends of the gangs.

Another feature resides in the provision of a controlling board mounted within easy reach of the driver and having mounted thereon devices through the operation of which the various mechanisms are set to operate and the adjustments effected.

A still further object of the invention is to provide a machine of the character described that will be strong, durable, efficient, and also one in which the several parts will not be likely to get out of working order.

With the above and other objects in view the invention has relation to certain novel features of construction and operation, an example of which is described in the following specification and illustrated in the accompanying drawings, wherein:

Figure 1 is a plan view of the cultivator, Fig. 2 is a side elevation, one of the wheels being omitted, Fig. 3 is a detail of the axle adjusting means, Fig. 4 is a partial plan view of the gang swinging means, Fig. 5 is a detail of the same in elevation, Fig. 6 is an elevation of a yoke forming part of the axle adjusting means, Fig. 7 is a rear elevation of the cultivator, certain parts being omitted and others being illustrated in section, Fig. 8 is a vertical sectional detail of a controlling device associated with the axle adjusting mechanism, Fig. 9 a transverse sectional detail of the parts shown in Fig. 8, Fig. 10 is an enlarged central longitudinal sectional detail of a portion of the cultivator, Fig. 11 is a detail of the controlling means for the weight adjusting mechanism, Fig. 12 is a horizontal cross-sectional view of the same, Fig. 13 is an enlarged side elevation of the weight adjusting mechanism, Fig. 14 is a detail in plan of the controlling means for the gang lifting mechanism, Fig. 15 is a vertical cross-sectional detail of the same, Fig. 16 is a transverse vertical sectional view of the same, Fig. 17 is a detail partially in section of the latch device for the gang elevating means, Fig. 18 is a detail in plan of the lever supporting decks, Fig. 19 is a detail in elevation of the operating connections for the various adjustment controlling devices, Fig. 20 is a front elevation of a part of the gang swinging means, Fig. 21 is a detail partially in section of the coupling sleeve 38, Fig. 22 is a side view of one of the clips 54 and adjacent parts, Fig. 23 is an enlarged detail in plan of the gang releasing and elevating controlling means, Fig. 24 is a detail of one of the bolts 139, and Fig. 25 is a detail in elevation of the arm 102 and component parts.

In the drawings the numeral 1 designates a transverse supporting frame, square in cross-section and forming the central supporting element around which the greater portion of the structure is built. Side frames extend forward from the main frame 1 and at right angles thereto, and are indicated by the numeral 2. These frames 2 are connected by braces 3 with a tongue 4 which is also connected rigidly with the frames 2 by a cross bar 5. A pair of seat bars 6 extend centrally and longitudinally of the machine, carrying a seat 7 at their rear ends and united at their forward ends, whereby a longitudinal seat member is formed. The bars 6 are pivoted to the under side of the frame 1 in a suitable manner as indicated at 8 in Figs. 7 and 10. The seat 7 being rigidly attached to the bars 6, it is obvious that by swinging the seat, said bars are swung on their pivots whereby the front end portion of said bars or member is swung laterally in a direction opposite to the seat. A grooved roller 9 is journaled on the front end of the seat member and engages the under side of a track 10 suspended from the tongue 4 and cross bar 5. This construction makes for an easy operation of the swinging seat member.

A pair of cultivator gangs 12 are supported at their front ends by pivoted links 13 suspended from the side frames 2. The gangs are held against rearward displacement by angularly disposed brace rods 14 pivoted at their upper ends to the frame 1 and at their lower ends to the gangs. The forward ends of the gangs are swung laterally, and also the rear portions elevated, by mechanisms hereinafter described. Parallel with each link 13 a companion link 15 is suspended from the side frame 2 and pivoted and connected to the gang swinging means. A rearwardly extending reach rod 16 is pivoted at its forward end to the link 15, one being provided for each gang. At the rear extremity of each gang 12 a cultivator foot frame 17 is pivoted and arranged to swing in a horizontal plane. Each frame 17 carries in a suitable manner a plurality of cultivator feet 18 and supports therefor. The rear end of the rod 16 is bent toward its respective gang and connected with the frame 17 thereof so that when the gang is swung, the rod will swing the frame thereof, whereby the relative positions of each gang and its foot frame are maintained and the feet 18 kept at right angles to the furrow.

Ground wheels 19 are provided and mounted on stub axles or trunnions 20 projecting outward from the lower ends of axle standards 21 carrying right angular bearing members 22 which support transverse axle members 23 having their inner adjacent ends oppositely screw threaded and engaging in a sleeve 24 having an integral bevel pinion 25 surrounding it as is best shown in Fig. 3. An extension frame 26 has its ends secured to the axle members and acts to keep the said members in alinement. A yoke member 27 (see Fig. 6) is included in the frame and receives a counter shaft 29 having a bevel pinion 28 fixed on its end and meshing with the pinion 25. By means of the yoke the frame 26 may be rocked transversely without disturbing the pinions.

The axle members 23 extend through the main frame 1 concentrically thereof, said members being supported in bearings 30 at the ends of the main frame and abutting the bearing members 22. The frame 26 is also disposed concentrically within the main frame, said main frame however is fixed in position and is not disposed to tilt or rock.

In each standard 21 a vertical drive shaft 31 is mounted and has its upper portion extending above the member 22. The lower portion of each standard is shaped to accommodate a bevel pinion 32 fixed on the lower end of the drive shaft thereof and meshing with a larger bevel gear 33 secured to the adjacent ground wheel 19. Just above the members 22 each shaft 31 includes a universal joint 34 and the upper end of said shaft is supported in the forked end of an upright bracket 35 projecting from a collar 39 on the axle member. By reason of the joint 34 each standard with its member 22 may be swung forward or rearward without swinging the upper portion of the drive shaft. On the upper end of each drive shaft a miter pinion 36 is fixed and meshes with a similar pinion 37 fixed on the end of a coupling sleeve 38 which has telescoping engagement with a relatively fixed coupling sleeve 40 rotatively mounted in a bearing bracket 41 extending upward from the frame 1.

The bracket 35 is correlated with the member 22 of each standard 21 so that when the axle members 23 are moved longitudinally the said parts are carried therewith, and by reason of the telescoping couplings the transmission of motion to the sleeves 40 is not broken. Each sleeve 40 is fixed on shaft member 42 extending therebetween over the axle members. A pair of miter gears 43 are loosely confined on the shaft member at the center thereof and mesh with a miter gear 44 disposed horizontally thereunder and which has driving connection with a bevel pinion 45 meshing with the pinion 25. The gear 44 and the pinion 45 are supported by a bracket 46 mounted on the frame 1 as is best shown in Fig. 10. A clutch collar 47 is splined on the shaft member between the gears 43 and when thrown either way engages one of the said gears and revolves the same. These gears rotate the sleeve 24, one rotating it in one direction and the other rotating it in the opposite direction, whereby the axle members 23 are extended or retracted.

In order to swing the ground wheels on their vertical axes so as to guide the cultivator to either side the standards 21 are pivoted in the members 22 and are also provided with forwardly extending integral arms 48. The outer end of each arm is pivoted to the outer end of a link 49 which is pivoted at its inner end to the lower end of a vertical lever 50 centrally pivoted on the lower end of an arm 51 projecting downward and forward from the axle member 23 associated therewith. Each lever 50 has its upper end pivoted to the outer end of a rod 52 having its inner end screw threaded and engaging in a sleeve 53 disposed over the seat bars 6. The sleeve 53 exhibits an angular shape in cross section but is rotatively confined in clips 54 hanging from the seat bars as shown best in Fig. 22. The sleeve 53 being rotatable but fixed against lateral displacement causes the rods 51 to be extended or retracted owing to the opposite threading of the rods. A bevel gear 55 is provided with an extended hub 56 and is slidable on the sleeve 53 which however owing to its contour is rotated by said gear. However the hub is fixed against sliding by an angular bar 57 extending therefrom and embracing the hub of a bevel pinion 58 which meshes with the gear 55 and is mounted to be revolved by the pinion 28 on the shaft 29 which is supported in a bearing hanger 59 suspended from the frame 1 as is best shown in Fig. 10.

It is obvious that when the axle members are extended or retracted the rods 52 must be adjusted likewise and this is accomplished by the pinions 28 and 58 and the gear 55. When it is desired to swing the wheels to either side so as to guide the cultivator the driver by swaying his body swings the seat 7 and the seat bars 6 toward the side toward which he desires to swing the wheels. The bars 6 through the clips 54 swing the sleeve 53 which pulls the rods 52 and swings the upper ends of the levers 50 so that their lower ends are swung opposite, whereby the wheels are swung through the agency of the links 49 and arms 48. It is desirable to at the same time swing the gangs 12 and this is effected by links 60 pivoted to the bars 6 and extending laterally under the frames 2. The outer ends of the links 60 are pivoted to crank member 61 rotatable on vertical rods 62 fixed at their upper ends to the frames 2 and resting at their lower ends on brackets 66, bent and having their rear ends secured to the main frame (Fig. 2) and their forward ends pivoted to the lower ends of straps 67 hanging from a cross bar 68 mounted on the tongue 4. The brackets also support the crank members 61 (Fig. 5). The lower ends of the cranks have yokes 63 in opposed relation to the swinging arms of the cranks. Crossed bars 64 and 65 have their inner ends pivoted to the ends of the yokes, the bar 64 being pivoted to the link 15 and the bar 65 to the link 13, whereby the gangs 12 and the foot frames 17 are swung in unison with the wheels 19 and in the proper direction. The gangs have stirrups 69 for the feet of the driver whereby the rear ends may be swung as desired.

One of the features of this cultivator is the adjustment whereby the mechanism supported by the axle standards 21 together with the latter may be tilted forward or rearward and the machine thus balanced with respect to the weight of the driver occupying the seat 7. This mechanism is illustrated in detail in Fig. 13 and is controlled by devices hereinafter described. An angular bracket 70 has one arm projecting forward and the other arm extending upright and carrying a bevel gear 71 at its upper end, which gear is fixed on the rear end of a forwardly extending shaft 72. The gear is disposed between and meshes with similar gears 73 which are loosely confined on the shaft 42. Between the gears 73 a clutch sleeve 74 is splined on the shaft 42 and by throwing the sleeve 74 to either side it is engaged with one of the gears 73 and transmits motion thereto.

The forward end of the shaft 72 is supported in the other arm of the bracket 70 and has fixed thereon a bevel pinion 75 meshing with a miter pinion 76 fixed on the upper end of a vertical shaft 77 also supported in the bracket 70. The vertical shaft has a screw threaded portion on which a collar member 78 is engaged, while the lower end of the shaft 77 rests on a supporting bar 79 extending from the frame 1 to the bar 5. The vertical shaft being rotated raises or lowers the member 78 according to the direction of rotation. A rearwardly extending lever 80 has loose connection with the member 78 and passes through the frame 26 so that the side members of the same rest on said lever which is loosely hung on one of the axle members by a strap 81.

In Fig. 13 the parts are in normal position or what may be intermediate position. It is obvious that if the shaft 77 is rotated to the right (Fig. 1) the member 78 will be moved downward by the screw threads and the lever 80 swung downward, whereby the frame 26 will be tilted forward. The axle members 23 being fastened to the said frame will be rocked forward whereby the axle standards 21 will be tilted forward, with the result that the frame 1 and the associated parts will be shifted forward with relation to the vertical axes of the ground wheels. This shifts the greater portion of the weight of the machine forward and compensates for the weight of the driver occupying the seat 7. For a driver of light weight the operation is reversed. When the machine is properly adjusted the tongue 4 will be poised. It will be understood that all adjustments are made while the cultivator is traveling and the wheels 19 revolving, except those effected by shifting the seat bars 6.

For raising and lowering the gangs 12 duplicate mechanisms are employed and a description of one will suffice for both. A drum 82 is loosely confined on the shaft 42 and is arranged to wind a steel cable 83 thereon. This cable passes rearward and downward at an angle and over a guide pulley 85 journaled in a bracket 86 mounted on a vertically slotted housing 84 through which the cable depends. The cable is attached to a jointed rod 87 which is attached to the gang 12 and pivotally supports the latter. The rod 87 is adapted to enter the slot of the housing when the cable is wound on the drum in raising the gang, and a notch 88 near the upper end of the rod is engaged by a horizontal spring latch 89 projecting into the slot, whereby the gang is held in its elevated position.

It is proposed to control the extension of the axle members 23 and shaft members 52, as well as the retraction; also the operation of the weight shifting means; and operation of the gang raising and releasing mechanism, from a controlling board 90 mounted in front of the seat just over the bars 6 and supported on the rear ends of supports 91 projecting rearwardly from the frame 1 as is best shown in Figs. 1, 2 and 10. On this board are a plurality of button-head plungers which I have lettered A, B, C, D, E, F, G and H respectively. The plungers are spring pressed and extend through the board, the button-heads being on the rear side of the board which constitutes the face and is within easy reach of the driver. On the front side of the board are a plurality of vertically disposed levers 92, each centrally pivoted on a bracket 93 projecting from the board. A lever is provided for each plunger and each lever has its upper free end in contact with the forward end of a plunger so that when the plunger is depressed the free end of the plunger is swung forward and the lower end swung rearward. All connections are made with the lower ends of the levers.

The plungers A and H control the gang raising and lowering by operating clutch mechanism for the drums 82. The plungers B and G are operated to release the latches 89 and permit the gangs 12 to be lowered. The plungers C and F are connected with weight shifting mechanism; while the plungers D and E are associated with the means for adjusting the axle members 23.

In Figs. 8 and 9 the controlling mechanism for adjusting the axle members 23 is shown in detail. A housing or casing 94 suitably supported on the frame 1 incloses said mechanism. The object of this mechanism is to shift the clutch sleeve or collar 47 into the gears 43. As shown best in Fig. 10 a shifting lever 95 engaging the collar is centrally pivoted on a bracket 96 which also supports the casing 94 and into which latter the rear end of the lever projects. By swinging said lever so that the collar 47 is moved to the right (Fig. 1) it is engaged with the right hand gear 43 and motion transmitted to the same from the shaft 42; whereby the pinion 45 is revolved to the right which revolves the sleeve 24 through the agency of the pinion 25 so that members 23 are expelled from said sleeve and the wheels 19 thus spread apart. By swinging the shifting lever 95 in the opposite direction so as to engage the collar 47 with the other gear 43 the operation is reversed and the axle members drawn into the sleeve 24 and the wheels 19 drawn toward each other.

The collar 47 normally occupies a position intermediate the gears 43 with the lever 95 in a central position at right angles to the shaft 42. The rear end of the lever 95 normally stands between a pair of spring pressed vertical latch plungers 97 which have their tops beveled away from the lever and project through a keeper 98 on which the lever rests. From the lower end of each plunger a link 99 extends down through the casing and is pivoted to a bell-crank lever 100 which has its opposite end pivoted to a rod 101 (Fig. 10) which extends rearward and has pivotal connection with one of the levers 92. These connections are made with levers 92 operated by the plungers D and E and so that when either is depressed the parts will be moved to pull down one of the plungers 97.

As shown in Fig. 8 the parts are in position to shift the rear end of the lever 95 to the left whereby its forward end will be shifted to the right and this would be accomplished by depressing the button of plunger D so as to pull down the left hand plunger 97 (Fig. 8). For throwing the lever 95 a centrally pivoted arm 102 as shown in Fig. 9 has its upper end pivoted to the lever 95 and its lower end forked and straddling a rod 103 between coiled springs 104 and 105 respectively, the former of which is shown under tension. When the left hand plunger 97 is drawn down the spring 104 will push the lower end of the arm 102 to the right, whereby the upper end is swung to the left, carrying the rear end of the shifting lever 95 with it. On each side of the plungers 97 spring pressed dogs 106 are mounted and as the lever 95 is shifted it depresses and comes to rest behind one of these dogs, which holds said lever in its shifted position. These dogs have their lower ends pivoted to triggers 107 pivoted in the casing and having upturned ends terminating in yokes 108, and when either of the triggers is depressed its dog is drawn downward, whereby the shifting lever is released and permitted to return to its normal position. On one of the axle members 23 an upstanding arm 109 is confined and is connected to the end of the rod 103 which projects from the casing. On the upper end of the arm 109 a bail 110 is pivoted and spring held as shown. This bail rests in one of the yokes and when the axle members are extended is moved to the left riding up the inclined surface of a boss 111 past a pawl 112 and over its mate and finally coming to rest on the yoke of the left hand trigger which is thus depressed. When the bail drops on the left hand yoke the axle members will have reached the limit of their extension, also the trigger being depressed will pull down the left dog 106 so that the shifting lever 95 will be released. The rod 103 being pulled to the left when the members 23 are extended will compress the spring 105 which bearing on the arm 102 swings the same and causes the return of the lever 95 when the left hand dog 106 is pulled down. For retracting the axle members the operation is reversed by depressing the button of the plunger E, which pulls down the right hand plunger 97 and permits the lever 95 to be shifted to the right whereby the collar 47 is shifted to the left and engaged with the left hand gear 43.

For controlling the sleeve 74 a shifting lever 113 is centrally pivoted and projects into a casing 114 mounted on the main frame. The lever 113 normally stands idle so that the sleeve is intermediate the gears 73 and has its rear end between a pair of spring pressed beveled plungers 115 mounted in the case, said plungers being similar to the plungers 97. Dogs 116 like those 106 are also mounted in the casing. Transverse horizontal levers 118 have connection intermediate their ends (Fig. 19) with vertical rods 117 depending from the plungers 115. These levers are pivoted bell-crank levers 119 similar to the levers 100, said levers 119 having their lower ends connected two of the levers 92 by means of links 120. The links 120 are connected with the levers of the plungers C and F. The bell-crank levers 100 and 119 are pivoted on brackets 121 depending from a lower deck 122 supported from the main frame and above which is supported an upper deck 123.

As shown in Figs. 11 and 13 an angular lever 124 has its upper portion pivoted on a bracket 125 projecting from the frame 1. A flat spring 126 fixed to the upper end of the lever 124 has its upper end in engagement with the shifting lever 113. The lower end of the lever 124 is connected by a link 127 which has its lower end pivoted to the rear end of the lever 80, the said rear end being enlarged as shown in Fig. 12. As shown in Fig. 11 the lever 124 is tilted and the spring 126 bent so to be under tension and tending to force the shifting lever to the left. By depressing the button of plunger C the left hand plunger 115 would be pulled down and the shifting lever swung to the left past the dog 116 on that side. The sleeve 74 will thus be moved to the right and the right hand gear 73 thus revolved whereby the collar member 78 will be carried downward as previously described. In Fig. 11 the collar is supposed to be in its upper position on the shaft 77 whereby the machine is tilted rearward for a light weight driver. The button of plunger C is depressed to shift for a light weight driver. When the sleeve 74 is shifted to the right the member 78 is run up on the shaft 77 whereby the frame 26 is tilted rearward. A rod 128 depends from the lower end of the left hand dog 116 and has a projection on its lower end in the path of the enlarged rear end of the lever 80 which strikes said projection and pulls the rod downward when the lever 80 has been swung to its limit by the collar reaching its highest point and the adjustment being completed. The pulling down of the dog releases the shifting lever 113 which returns to normal position. When the lever 80 is swung as just described the angular lever is swung by the link 127, downward and the spring 126 bent so as to exert its tension to the right, whereby the lever 113 is returned to normal as described. The button F is depressed to shift for a heavy man and causes the right hand plunger 115 to be pulled down so that the shifting lever is swung to the right and the sleeve 74 to the left. When the collar member 78 has been run on the shaft 77 and the rear end of the lever 80 swung upward, the latter engaged a bell-crank lever 130 having its upper end connected to a rod which is attached to the right hand dog 116 and pulls the latter down thus permitting the shifting lever to return to normal position.

For releasing the cultivator gangs the plungers B and G are employed and each operates as follows: A rod 131 is attached to the lower end of lever 92 and has its forward end attached to a bell-crank lever 132 (Fig. 18) which has its other end attached to a rod 133 extending parallel of the frame 1 and having its opposite end attached to the latch 89 which is withdrawn when the lever 92 is swung by either plunger B or G. The latch being withdrawn from the rod 87, the latter may be lowered.

For raising gangs there is splined on the shaft 42 opposite each drum 82, a clutch collar 141 which is operated by a shifting lever 142 pivoted at its forward end to the frame 1, connected to the collar intermediate its ends and having its rear end projecting into a casing 135. A description of one shifting means will suffice for both as the means are duplicates, one being controlled by the plunger A and the other by the plunger H. From the lever 92 a link 137 extends forward and is pivoted to the lower end of a vertical lever 138 pivoted on the lower deck 122 and being pivoted at its upper end to a bolt 139 which is slidable on the upper deck 123. A rod 140 extending from the casing 135 parallel with the frame 1 and at right angles to the bolt impinges said bolt and is held thereby. When the lever 92 is swung by depressing plunger A or H the rod 137 (Fig. 2) is pulled rearwardly whereby the lever 138 is swung so as to move bolt 139 forward so that an offset (Fig. 24) therein is brought opposite the end of the rod 140 which is sprung into the offset. Within the casing a sliding latch bar 143 disposed at right angles to the rod 140 bears on said rod at one end and projects into the path of a right-angular shifting member 155 at its other end as shown in Fig. 14. A lever 144 is pivoted in the casing and has two flat springs 145 and 146, the former engaging the rod 140 and tending to force it toward the bolt and the latter engaging the bar 143 and tending to force it rearward and out of the path of the member 155 which is under spring tension.

With the parts in the position shown in Figs. 14, 15 and 16 the gang is lowered and the proper button having been pressed to raise the gang as above stated, the rod 140 is moved to the left by spring 145 when the bolt 139 is moved forward. This permits the spring 146 to move bar 143 rearward whereby member 155 is pushed to the right and the lever 142 moved to the right which moves the collar 141 into the drum 82 so that the latter is revolved and the gang elevated by the cable 83 which is wound on the drum. As the gang is elevated the rod 87 enters the slot of the housing 84 (Figs. 2 and 17) and projects its upper end above said housing so to strike and raise an angular lever 152 before being engaged by the latch 89. When the lever 152 is raised its upper end is swung inward, said lever being pivoted to the casing 135 as shown in Figs. 14 and 15. A bar 147 slidable in the casing projects through into the path of the upper end of the lever 152 and is pushed inward thereby against the tension of a spring encircling the bar as shown. A dog 149 is centrally pivoted on the bar 147 and engages a notch in a bar 148 disposed between the bar 147 and the member 155. This dog carries the bar 148 inward against the tension of a spring coiled about said bar. The inner end of the member 155 overhangs the end of the bar 148, the former having a lug 154 projecting into the path of a lug 153 carried by the latter, so that when the bars are pushed inward the lugs engage and the member 155 is returned to normal position whereby the lever 142 is shifted and the clutch connection broken. When the member 155 is returned and the bar 148 moved inward the lever 144 will be swung so as to tension springs 145 and 146, whereby the rod 140 will be pulled back and the bar 143 moved forward thus restoring these parts to their normal positions. When the bar 143 moves forward a pin 150 mounted thereon strikes the dog 149 and swings the same out of the notch of the bar 148, so that when the gang is lowered by withdrawing latch 89 as before described, and the lever 152 freed, the springs will return the bars 147 and 148 to their normal positions, a notch 151 permitting the dog 149 to again engage the notch of the bar 148 and the lever 144 swung so as to tension the springs 145 and 146 in the opposite direction.

What I claim, is:

1. In a cultivator the combination of an arched axle constructed for extension and retraction, a main frame carried by the axle and supporting the same, ground wheels mounted on the axle and arranged to swing laterally, means associated with the main frame and axle for swinging the wheels, a seat member pivoted to the frame and connected to the swinging means, and means for simultaneously adjusting the wheel swinging means in harmony with the extension and retraction of the axle.

2. The combination in a cultivator of an arched axle comprising longitudinally adjustable members, a transverse main frame surrounding the axle, a telescoping tilting frame mounted on the axle members within the main frame, means for adjusting the axle members longitudinally, and means for tilting the telescoping frame forward and rearward with relation to the axle, whereby the main frame is swung forward and rearward.

3. The combination in a cultivator of an arched axle comprising longitudinally adjustable members, a transverse main frame surrounding the axle, a telescoping tilting frame mounted on the axle members within the main frame, means for adjusting the axle members longitudinally, an adjusting element engaging the telescoping frame and constructed to tilt said frame forward and rearward with relation to the axle, means for operating said element, and controlling means for the last named operating means constructed to be arrested in its operation by the adjusting element.

4. The combination in a cultivator of ground wheels, an arched axle mounted on the wheels and capable of movement forward and rearward, a transverse frame surrounding the axle, said frame being non-tilting, a tilting frame disposed within the first frame and connected to the axle, a tilting member for the tilting frame disposed at right angles thereto, means for adjusting said tilting member whereby said tilting frame is tilted and the axle swung, and controlling means for the means for adjusting the tilting member, said last named means being constructed to be operated by the tilting member to interrupt the operation of the means for adjusting the tilting member.

5. The combination with the arched axle constructed to be adjusted transversely of the cultivator, the ground wheels mounted on the axle and arranged to be swung laterally, the cultivator gangs arranged to be elevated at their rear ends and swung laterally at their forward ends; and the tilting member for swinging the axle forward and rearward; of means for adjusting the axle transversely of the cultivator; means for swinging the wheels laterally; means for elevating the rear ends of the gangs; means for swinging the gangs laterally at their forward ends; and means for operating the tilting member to swing the axle.

6. The combination in a cultivator of a frame, an axle carrying the frame, ground wheels mounted on the axle so as to swing laterally, a longitudinal seat member pivoted on the frame and arranged to swing laterally, gangs suspended from the frame, foot frames mounted on the rear ends of the gangs so as to swing in a horizontal plane, connections between the seat member and the wheel swinging construction, a swinging mechanism for each gang connected with the seat member and the forward ends of the gangs, and connections between gang swinging means and the foot frames for adjusting the frames in harmony with the gangs.

7. The combination in a cultivator, of a transverse main frame, side frame extending forward from the main frame, an arched axle having members disposed in the main frame, means in the main frame for adjusting the axle members longitudinally, ground wheels, axle standards mounted on the axle supporting the ground wheels and arranged to swing laterally, a longitudinally adjustable connection extending transversely between the axle standards, a device for adjusting connection, a seat member pivoted on the main frame and connected with the transverse connection, means for operating the axle member adjusting means and the connection adjusting means in unison, a longitudinally adjustable shaft mounted on the main frame and having connections with the last named operating means, and a driving connection between the ground wheels and the shaft.

In testimony whereof I affix my signature.

JUSTICE E. BLALOCK.

Copies of this patent may be obtained for five cents each, by addressing the "Commissioner of Patents, Washington, D. C."